United States Patent Office 3,475,376
Patented Oct. 28, 1969

3,475,376
PERHALOACETONE BASED POLYMERS CROSS-
LINKED WITH ALKYLENIMINES
Harry A. Smith, Midland, Mich., assignor to The Dow
Chemical Company, Midland, Mich., a corporation of
Delaware
No Drawing. Continuation-in-part of application Ser. No.
642,705, June 1, 1967. This application Jan. 10, 1969,
Ser. No. 790,462
Int. Cl. C08g 15/00, 23/06
U.S. Cl. 260—63                                        8 Claims

ABSTRACT OF THE DISCLOSURE

This invention relates to curable interpolymers of a perhaloacetone base polymer with a lower alkyleneimine.

The perhaloacetone base polymer is composed of an interpolymer of a perhaloacetone, with a diepoxide, a polyepoxide or an unsaturated epoxide. Such perhaloacetone base polymer may also contain one or more alkylene oxides. The polymer product contains pendent aziridine groups which may be crosslinked to form a highly water-resistant polymer useful as a coating.

---

This application is a continuation-in-part of my copending application Ser. No. 642,705, filed June 1, 1967 and now abandoned.

BACKGROUND OF THE INVENTION

Curable halogen-containing polymers and copolymers are known which contain two or more epoxide groups and which may therefore be crosslinked through the epoxide groups with a reactive di- or polyfunctional curing agent. Likewise curable halogen-containing polymers and copolymers are known which contain ethylenic unsaturation in the polymer chain and therefore may be cured or crosslinked through the ethylenic double bond to form a thermoset polymer. Such curable polymers are highly water-insoluble and find utility as coatings and adhesives but frequently suffer from the disadvantage that they lose adhesive properties when exposed to weathering, water or moisture ladened air for extended periods of time.

SUMMARY OF THE INVENTION

The interpolymers of this invention provide to the art a new group of perhaloacetone-containing polymers having pendent aziridine groups and which are therefore curable to form halogen-containing, solvent resistant, thermoset plastics having enhanced weather and water resistant properties.

It is an object of this invention to provide new halogen-containing curable polymers. Another object is to provide halogen-containing interpolymers which contain aziridine groups and which are capable of being crosslinked to form a thermoset polymer. These and other objects and advantages of the present invention will become apparent from a reading of the following detailed description.

The novel compositions of this invention comprise the reaction product of a lower alkyleneimine and a perhaloacetone base polymer containing either ethylenic unsaturation or epoxide groups or both. Such compositions are therefore halogen-containing polymers having pendent aziridine groups capable of curing by crosslinking to form a thermoset polymer.

BRIEF DESCRIPTION OF PREFERRED EMBODIMENTS

As used herein, the term "perhaloacetone base polymer" refers to interpolymers containing from about 30 to about 67 mole percent of a perhaloacetone, from about 1 to about 50 mole percent of a diepoxide, a polyepoxide, an unsaturated epoxide or mixtures thereof and up to about 49 mole percent of one or more alkylene oxides.

The term "halo" as used herein is meant to include chloro and fluoro-substituents. Perhaloacetones contained in the perhaloacetone base polymer of this invention include perfluoroacetone (hexafluoroacetone) and perchloroacetone (hexachloroacetone) as well as mixed chloro and fluoro perhalosubstituted acetones. Illustrative mixed perhalosubstituted acetones include dichlorotetrafluoroacetone, tetrachlorodifluoroacetone, monochloropentafluoroacetones and the like.

Ethylenically unsaturated epoxides suitable for use in the perhaloacetone base polymer of this invention include allyl glycidyl ether, glycidyl acrylate, butadiene monoepoxide and the like.

Suitable di- and polyepoxides suitable for use in the perhaloacetone copolymer of this invention include epoxy resin such as the diglycidyl ether of Bisphenol A, epoxidized novolacs having functionalities greater than 2, butadiene, diepoxide, divinylbenzene diepoxide, diisopropylidenediepoxide, tri- or diepoxydiphenyl ethers and the like.

Lower alkylene oxides useful in such perhaloacetone base polymer are those containing from 2 to 4 carbon atoms and include ethylene oxide, propylene oxide, 1,2-butylene oxide, 2,3-butylene oxide, and mixtures thereof.

The lower alkylenimines which may be employed in this invention are those containing from 2 to 4 carbon atoms and include ethylenimide, propylenimine, 1,2-butylenimine, 2,3-butylenimine and mixtures thereof.

Polymers of this invention are characterized by being capable of crosslinking through the aziridine groups to provide hydrophobic, oleophobic polymers having increased softening points and a high degree of resistance to water, weathering and exposure to moist air. Such polymers therefore find particular utility as exterior coatings for materials such as wood.

The crosslinking reaction may be produced by the application of heat to the polymer or by employing a catalyst for the crosslinking reaction. Suitable catalysts include organic and inorganic acids such as HCl, $H_2SO_4$ and the sulphonic acids.

Generally, the polymers of this invention are prepared by reacting the perhaloacetone base polymer with a lower alkylenimine in molar proportion of from 1:1 to about 100:1 or more of lower alkylenimine to base polymer. It is generally preferred, however, to employ greater than about 2 times the stoichiometric proportion of such alkylenimine with a mole ratio of alkylenimine to base polymer of from about 6/1 to about 100/1 being particularly preferred. The reaction is conducted by heating the reactants in a substantially anhydrous inert atmosphere at temperatures from about 20° to about 100° C. for a period of from about 3 to about 72 hours or more. It is usually preferred to conduct the reaction between room temperature and about 60° C. at about atmospheric pressure. It is likewise desirable to conduct the reaction in an inert substantially anhydrous atmosphere or wherein the atmosphere is composed of the vapor of one or more of the reactants. Inert solvents or diluents may likewise be employed to moderate the reaction.

The composition of the curable polymers of this invention is controlled by the proportion of reactive sites (i.e., ethylenic unsaturation or epoxide groups) contained on the perhaloacetone base polymer. It is preferred, therefore, to employ perhaloacetone base polymers which contain from about 1 to about 15 perhaloacetone groups for each aziridine group.

The following examples will serve to further illustrate the present invention but are not meant to limit it thereto.

EXAMPLE 1

A perfluoroacetone base polymer was prepared from hexafluoroacetone, propylene oxide and butadiene monoepoxide such that the mole ratio of such monomers in the polymer was about 1/1/1. A 1.87 gm. portion (0.00802 equivalent of C=C) of such polymer was mixed with 4.3 grams (0.1 mole) of ethylenimine at room temperature under autogenous pressure for a period of 96 hours. The excess ethylenimine was then evaporated from the mixture and the product was dried in a vacuum oven at 40° C. A yield of 2.4 gm. of an oily polymer was obtained. This represented a yield of 100 percent of theoretical. Analysis showed the polymer to contain no residual unsaturation and to contain aziridinyl groups as side chains.

EXAMPLE 2

A perhaloacetone base polymer was prepared from hexafluoroacetone, ethylene oxide, propylene oxide, and butadiene monoepoxide such that the mole ratio of such monomers in the polymer was about 10/5.5/2.25/2.25, respectively. A 2.47 gm. portion of such polymer containing 0.00250 equivalent of C=C was mixed with 4.3 grams (0.1 mole) of ethylenimine and allowed to react under the conditions of Example 1 for 6 days. At the end of this period, the excess ethylenimine was removed. A yield of 2.57 gm. of a brown solid polymer was obtained containing aziridinyl groups as side chains and no unsaturation. This quantity of polymer represented a yield of 99.7 percent of theoretical.

EXAMPLE 3

A perhaloacetone base polymer was prepared having a mole ratio of hexafluoroacetone/ethylene oxide/propylene oxide/butadiene diepoxide of 10/3.75/5/1.25. A 22.2 gm. portion of this polymer was admixed with 40 ml. of ethylenimine and the mixture was refluxed at 55–60° C. for 14 hours in a nitrogen atmosphere. At the end of this period, the excess ethylenimine was removed by vacuum distillation. A yield of 22.4 gm. of a viscous polymeric oil was obtained representing a yield of 98.5 percent of theoretical. Analysis of the product showed the original epoxy groups to have been replaced by aziridinyl groups.

EXAMPLE 4

A perchaloacetone base polymer was prepared having a mole ratio of hexafluoroacetone/ethylene oxide/propylene oxide/butadiene diepoxide of 10/6.5/2.8/0.7. A 110.0 gm. portion of this polymer containing 0.0350 equivalents of free epoxide, was admixed with 181 ml. (3.50 moles) of ethylenimine and the mixture was refluxed at 55–60° C. for 45 hours under a dry air atmosphere. At the end of this period, the excess ethylenimine was removed by vacuum distillation. A yield of 106.2 gm. of an almost white solid polymer melting at 127–143° C. was obtained representing a yield of 95 percent of theoretical. Analysis of the product by infrared showed the presence of aziridine groups and the absence of epoxy groups.

EXAMPLE 5

Portions of the products prepared in Examples 1 and 2 were dissolved in methyl isobutyl ketone containing a trace of $H_2SO_4$. The solutions were then quickly painted on 8 x 12 inch flat grain pieces of yellow pine board. As a control, additional pieces of pine were painted in the same manner with a solution of the perhaloacetone base polymers of Examples 1 and 2 which had not been reacted with an aziridine. After curing for 5 minutes at 155° C., the test boards were placed in a high humidity outdoor exposure area. After 4 months of exposure there had been no apparent change in the coating on these test boards. However, the controls coated with the hexafluoroacetone starting materials of Examples 1 and 2 in the same manner completely lost their coating in 2 to 4 weeks.

Various modifications can be made in the present invention without departing from the spirit or scope thereof for it is understood that I limit myself only as defined in the appended claims.

I claim:
1. A curable polymer composition consisting essentially of the reaction product of a perhaloacetone base polymer, composed of an interpolymer of from about 30 to about 67 mole percent of a perhaloacetone, from about 1 to about 50 mole percent of an epoxide selected from the group consisting of allyl glycidyl ether, glycidyl acrylate, butadiene monoepoxide, the diglycidyl ether of 2,2-di (4-hydroxyphenyl) propane, an epoxidized novolac having a functionality of greater than 2, butadiene diepoxide, a triepoxydiphenyl ether and a diepoxydiphenyl ether and up to about 49 mole percent of a lower alkylene oxide containing 2 to 4 carbon atoms, with a lower alkylenimine containing from 2 to 4 carbon atoms at a temperature of from about 20° to about 100° C. in a substantially anhydrous inert atmosphere.

2. The curable polymer of claim 1 wherein the mole proportion of alkylenimine to perhaloacetone base polymer reactants is at least about 1/1.

3. The curable polymer of claim 1 wherein the mole proportion of alkylenimine to perhaloacetone base polymer reactants is from about 100/1 to 6/1.

4. The curable polymer of claim 3 wherein the lower alkylenimine is ethylenimine.

5. The curable polymer of claim 3 wherein the perhaloacetone base polymer is a terpolymer of hexafluoroacetone, propylene oxide and butadiene monoepoxide in equimolar proportions.

6. The curable polymer of claim 3 wherein the perhaloacetone base polymer is an interpolymer of hexafluoroacetone, ethylene oxide, propylene oxide and butadiene monoepoxide containing a mole ratio of 10/5.5/2.25/2.25 of hexafluoroacetone/ethylene/oxide/propylene oxide/butadiene monoepoxide.

7. The curable polymer of claim 3 wherein the perhaloacetone base polymer is an interpolymer of hexafluoroacetone, ethylene oxide, propylene oxide and butadiene diepoxide containing a mole ratio of 10/6.5/2.8/0.7 of hexafluoroacetone/ethylene oxide/propylene oxide/butadiene diepoxide.

8. The curable polymer of claim 3 wherein the perhaloacetone base polymer is an interpolymer of hexafluoroacetone, ethylene oxide, propylene oxide and butadiene diepoxide containing a mole ratio of 10/3.75/5/1.25 of hexafluoroacetone/ethylene oxide/propylene oxide/butadiene diepoxide.

References Cited
UNITED STATES PATENTS 3,316,216  4/1967  Fawcett et al. _____ 260—63

WILLIAM H. SHORT, Primary Examiner

L. L. LEE, Assistant Examiner

U.S. Cl. X.R.

260—47, 830